United States Patent
Lee et al.

(10) Patent No.: US 6,587,324 B2
(45) Date of Patent: Jul. 1, 2003

(54) POWER-OFF PROTECTION DEVICE

(75) Inventors: Chih-Sheng Lee, Junghe (TW);
Meng-Feng Chen, Junghe (TW);
Chien-Chi Hsu, Junghe (TW);
Chien-Fa Chuang, Junghe (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 0 days.

(21) Appl. No.: 10/060,552

(22) Filed: Jan. 30, 2002

(65) Prior Publication Data
US 2003/0058021 A1 Mar. 27, 2003

(30) Foreign Application Priority Data
Sep. 24, 2001 (TW) ........................................ 090123437

(51) Int. Cl.[7] .................................................. H02H 3/00
(52) U.S. Cl. .......................................... 361/92; 361/78
(58) Field of Search .............................. 361/90, 18, 78, 361/92

(56) References Cited
U.S. PATENT DOCUMENTS
5,177,408 A * 1/1993 Marques .................... 315/291
6,418,002 B1 * 7/2002 Yang et al. .................... 361/90
6,449,177 B1 * 9/2002 Chen .......................... 363/95

* cited by examiner

Primary Examiner—Bao Q. Vu
(74) Attorney, Agent, or Firm—Merchant & Gould; Tim Tingkang Xia

(57) ABSTRACT

A power-off protection device. The device outputs operating power according to a first level signal and a second level signal, and comprises a processor, a modulating circuit, a power generating circuit, and a reference-voltage maintenance device. The processor outputs a voltage modulating signal. The circuit is coupled to the processor and the first level signal to output a voltage control signal responding to the voltage modulating signal. The power generating circuit is coupled to the second level signal and the modulating circuit for generating operating power from the second level signal according to the voltage control signal. The reference -voltage maintenance device is coupled to the first level signal and the modulating circuit to delay the drop time of the first level signal to confirm that the first level signal is higher than the second level signal when the first level signal and the second level signal are turned off.

8 Claims, 3 Drawing Sheets

| VID4 | VID3 | VID2 | VID1 | VID0 | Vop |
|---|---|---|---|---|---|
| 1 | 1 | 1 | 1 | 0 | 1.100 |
| 1 | 1 | 1 | 0 | 1 | 1.125 |
| 1 | 1 | 1 | 0 | 0 | 1.150 |
| 1 | 1 | 0 | 1 | 1 | 1.175 |
| 1 | 1 | 0 | 1 | 0 | 1.200 |
| 1 | 1 | 0 | 0 | 1 | 1.225 |
| 1 | 1 | 0 | 0 | 0 | 1.250 |
| 1 | 0 | 1 | 1 | 1 | 1.275 |
| 1 | 0 | 1 | 1 | 0 | 1.300 |
| 1 | 0 | 1 | 0 | 1 | 1.325 |
| 1 | 0 | 1 | 0 | 0 | 1.350 |
| 1 | 0 | 0 | 1 | 1 | 1.375 |
| 1 | 0 | 0 | 1 | 0 | 1.400 |
| 1 | 0 | 0 | 0 | 1 | 1.425 |
| 1 | 0 | 0 | 0 | 0 | 1.450 |
| 0 | 1 | 1 | 1 | 1 | 1.475 |
| 0 | 1 | 1 | 1 | 0 | 1.500 |
| 0 | 1 | 1 | 0 | 1 | 1.525 |
| 0 | 1 | 1 | 0 | 0 | 1.550 |
| 0 | 1 | 0 | 1 | 1 | 1.575 |
| 0 | 1 | 0 | 1 | 0 | 1.600 |
| 0 | 1 | 0 | 0 | 1 | 1.625 |
| 0 | 1 | 0 | 0 | 0 | 1.650 |
| 0 | 0 | 1 | 1 | 1 | 1.675 |
| 0 | 0 | 1 | 1 | 0 | 1.700 |
| 0 | 0 | 1 | 0 | 1 | 1.725 |
| 0 | 0 | 1 | 0 | 0 | 1.750 |
| 0 | 0 | 0 | 1 | 1 | 1.775 |
| 0 | 0 | 0 | 1 | 0 | 1.800 |
| 0 | 0 | 0 | 0 | 1 | 1.825 |
| 0 | 0 | 0 | 0 | 0 | 1.850 |
| 1 | 1 | 1 | 1 | 1 | OFF |

FIG. 2

POWER-OFF PROTECTION DEVICE

BACKGROUND OF THE INVENTION

1. Field of the Invention

The present invention relates in general to a power-off protection device. In particular, the present invention relates to a power-off protection device to prevent abnormal high-level signal generated during main power shutdown.

2. Description of the Related Art

Recently, most PC products and peripheral devices have adopted switching power, which uses pulse-width modulation (PWM) to control integrated circuits (IC) to act as the power controlling circuit.

FIG. 1 depicts a circuit diagram of a conventional power supply. Pulse-width modulation integrated circuit 10 (PWM IC) outputs a voltage control signal responding to the voltage modulating signal at the input of the PWM IC 10 provided by the CPU 12. The voltage control signal is a high frequency signal. The pulse width of the voltage control signal is adjusted responding to the voltage modulating signal provided by the CPU 12. Then, the voltage control signal is input into a voltage generating circuit 14. The voltage generating circuit 14 generates operating voltage $V_{op}$ from the power provided by $V_{cc2}$ according to the voltage control signal, then the operating voltage $V_{op}$ is provided to the CPU 12 for operation.

FIG. 2 shows a table of the signals output from CPU 12 (VID0~VID4) to the PWM IC 10 and the output voltages $V_{op}$ of the voltage generating circuit 14. The output voltage $V_{op}$ of the power supply is controlled by the signals input to the PWM IC 10. In FIG. 1, the inputs of the PWM IC 10 (VID0~VID4) are connected to $V_{cc1}$ (3.3V) through pull-up resistor R1. Therefore, when the system is not active, the operating voltage $V_{op}$ is off while the inputs of the PWM IC 10 (VID0~VID4) all receive high level signals. In addition, when CPU 10 operates, the PWM IC 10 controls the voltage generating circuit 14 to generate the desired voltage responding to the signals input to the inputs of the PWM IC 10 (VID0~VID4) from CPU 12.

Generally, when the main power is turned off, $V_{cc2}$ drops to low level faster than $V_{cc1}$, so the system is turned off successfully. However, when an abrupt $V_{cc1}$ drop to low level is faster than $V_{cc2}$, at this time, $V_{cc2}$ is still at high level, the operating voltage $V_{op}$ reaches 1.85V (refer to the table in FIG. 2), because the inputs of the PWM IC 10 (VID0~VID4) all receive low level signals when $V_{cc2}$ is still at high level, the voltage generating circuit 14 generates the signal at 1.85V from $V_{cc2}$, which damages the CPU.

SUMMARY OF THE INVENTION

The present invention provides a power-off protection device, which adds a reference-voltage maintenance device at the input of the PWM IC to delay the PWM IC power dropping to low level, ensuring that the power of the voltage generating circuit drops to low level first. Thus, the situation in the prior art wherein the inputs of the PWM IC receive low level signals and generate excessive high voltage is prevented.

To achieve the above-mentioned object, the present invention provides a power-off protection device for outputting operating power according to a first level signal and a second level signal, which comprises a processor, a modulating circuit, a power generating circuit, and a reference-voltage maintenance device. The processor outputs a voltage modulating signal. The modulating circuit is coupled to the processor and the first level signal to output a voltage control signal responding to the voltage modulating signal. The power generating circuit is coupled to the second level signal and the modulating circuit to generate the operating power from the second level signal according to the voltage control signal. The reference -voltage maintenance device is coupled to the first level signal and the modulating circuit to delay the drop time of the first level signal to confirm that the first level signal is higher than the second level signal when the first level signal and the second level signal are turned off.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 2 shows a table of the signals output form CPU 12 (VID0~VID4) to the PWM IC 10 and the output voltages $V_{op}$ of the voltage generating circuit 14.

DETAILED DESCRIPTION OF THE PREFERRED EMBODIMENT

Figure 1:
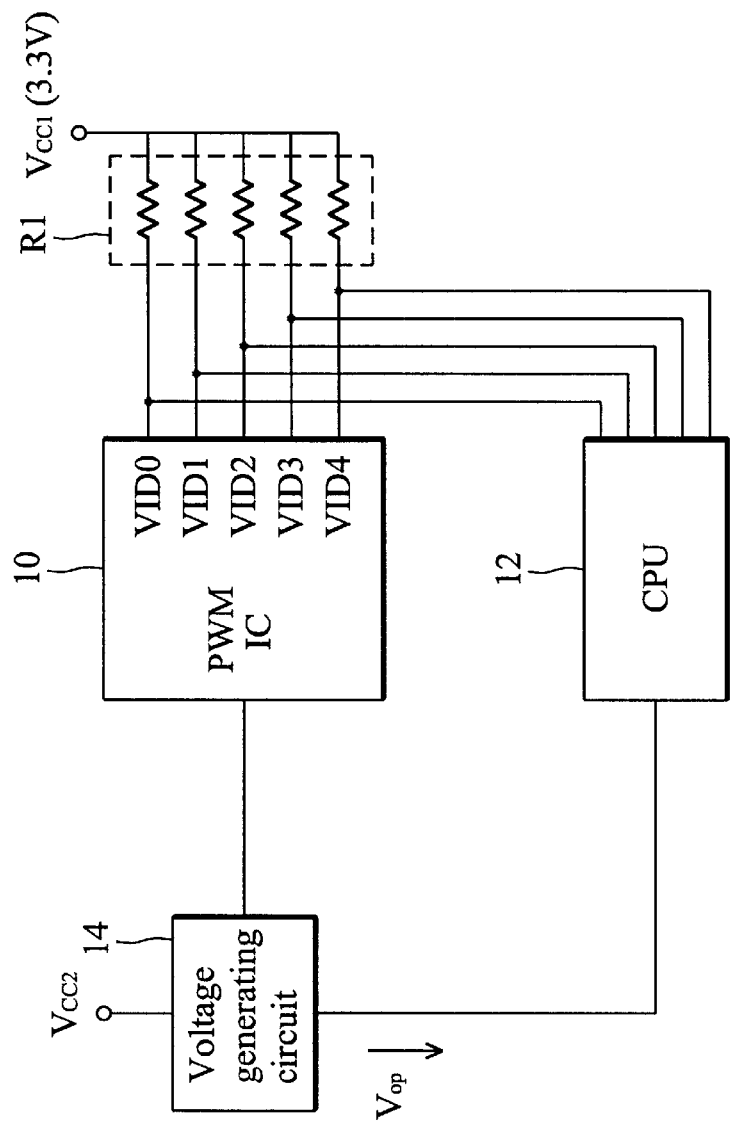
FIG. 1 depicts a circuit diagram of the conventional power supply.
Figure 3:
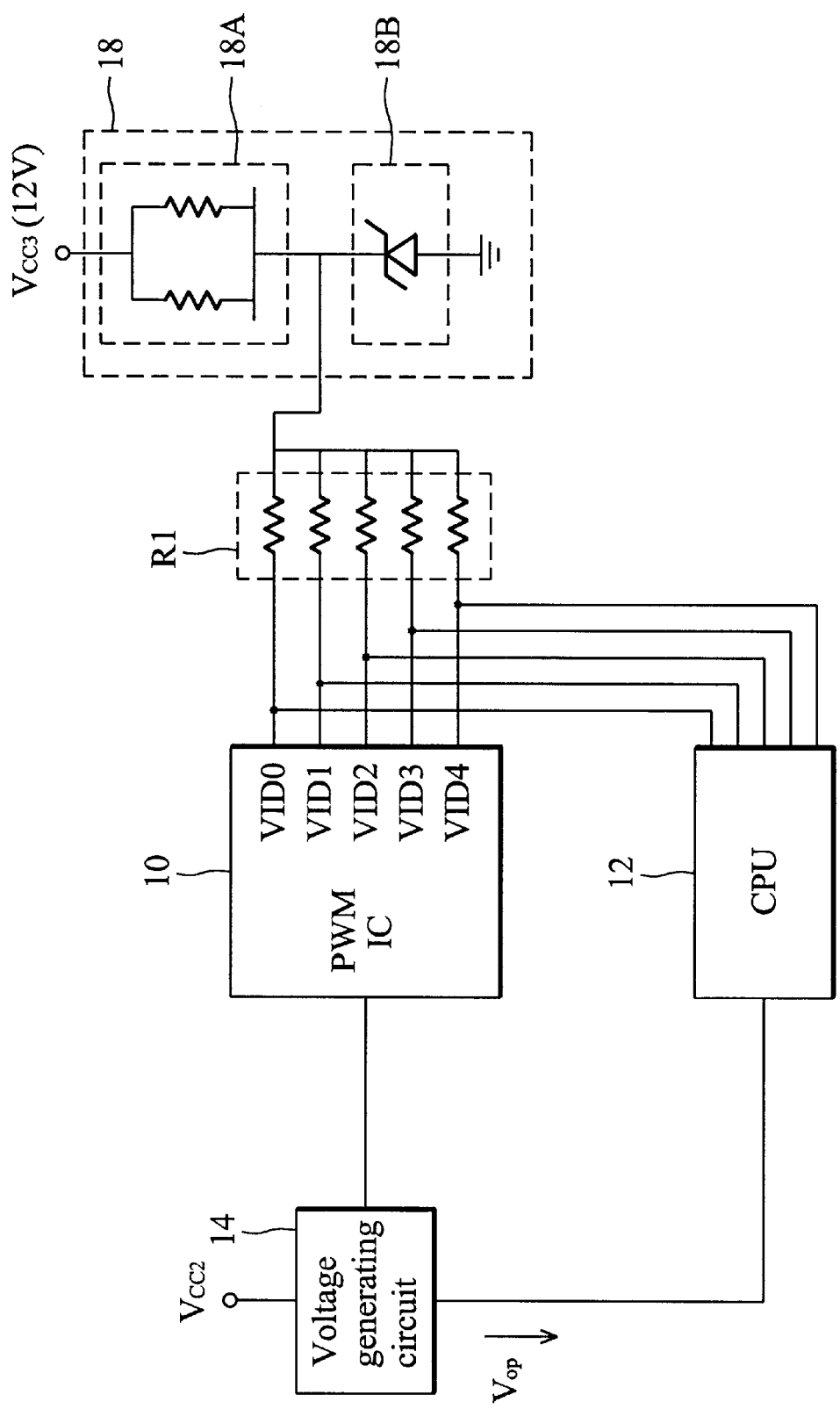
FIG. 3 shows a circuit diagram of the power-off protection device according to the embodiment of the present invention.

FIG. 3 shows a circuit diagram of the power-off protection device according to the embodiment of the present invention.

The modulating circuit (PWM IC) 10 outputs a voltage control signal responding to the voltage modulating signal at the input of the PWM IC 10 provided by the CPU 12. The voltage control signal is a circulating high frequency signal. The pulse width of the voltage control signal is adjusted responding to the voltage modulating signal provided by the CPU 12. Then, the voltage control signal is input into a voltage generating circuit 14. The voltage generating circuit 14 generates operating voltage $V_{op}$ from the power provided by $V_{cc2}$ according to the voltage control signal, then the operating voltage $V_{op}$ is provided to the CPU 12 for operation.

According to the power supply of the present invention, the inputs of the PWM IC 10 (VID0~VID4) are connected to the reference-voltage maintenance device 18 through pull-up resistor R1. The power source of the reference-voltage maintenance device 18 is $V_{cc3}$, higher than the power source of prior art $V_{cc1}$ (3.3V). In this embodiment, $V_{cc3}$ is 12V as an example.

The reference-voltage maintenance device 18 comprises a flow-limiting resistor 18A and a constant voltage diode 18B. The one terminal of the flow-limiting resistor 18A is coupled to the $V_{cc3}$, and the other terminal is coupled to the constant voltage diode 18B. In the present embodiment, the constant voltage diode 18B is a Zener diode, and the breakdown voltage of the Zener diode is 3.3V. The connection point of the flow-limiting resistor 18A and a constant voltage diode 18B is coupled to the inputs of the PWM IC 10 (VID0~VID4) to result in a voltage pulling up circuit with constant voltage difference. The 12V-power source provided by the $V_{cc3}$ keeps the voltage difference between the two terminals of the Zener diode 18B to 3.3V. Therefore, when the system is not active, the operating voltage $V_{op}$ is off while the inputs of the PWM IC 10 (VID0~VID4) all receive signals with constant 3.3V voltage, which is the same as the prior art. In addition, when CPU 10 operates, the PWM IC 10 controls the voltage generating circuit 14 to generate the desired voltage responding to the signals input to the inputs of the PWM IC 10 (VID0~VID4) from CPU 12.

According to the design of the present invention, the time needed for the $V_{cc3}$'s drop to lower level is longer than that for the $V_{cc1}$ when the main power is turned off, because the voltage level of $V_{cc3}$ (12V) is higher than $V_{cc1}$ (3.3V). In addition, the signals input to the inputs of the PWM IC 10 (VID0~VID4) drop to low level until $V_{cc3}$ drops from 12V to 3.3V. Moreover, the terminal for providing $V_{cc3}$ comprises large input capacitance, so the discharge time of $V_{cc3}$ is increased by adding flow-limiting resistors 18A. Therefore, $V_{cc3}$ requires more time to drop to low level than Vcc1.

When the signals input to the inputs of the PWM IC 10 (VID0~VID4) have dropped to low level, even the voltage control signal output by the PWM IC 10 requires the power generating circuit 14 to generate the signal with 1.85V caused by main power turning off, the power generating circuit 14 can't generate the responding voltage since $V_{cc1}$ is at low level. Therefore, the CPU 12 damaged by the unexpected high level signal at shutdown is prevented.

The power supply according to the present invention only need to add a reference-voltage maintenance device at the input terminals of the PWM IC, without complicated circuitry design and logic operation. Therefore, the required time of the power connected to the PWM IC is delayed when the main power is turned off to make sure the power of the voltage generating circuit dropped to low level in advance. Therefore, the situation of prior art that all of the input of the PWM IC receive low level signals and generates excessive high voltage is prevented.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A power-off protection device for outputting operating power according to a first level signal and a second level signal, comprising:

a processor for outputting a voltage modulating signal;

a modulating circuit coupled to the processor and the first level signal for outputting a voltage control signal responding to the voltage modulating signal;

a power generating circuit coupled to the second level signal and the modulating circuit for generating the operating power from the second level signal according to the voltage control signal; and a reference-voltage maintenance device coupled to the first level signal and the modulating circuit to delay drop time of the first level signal to confirm that the first level signal is higher than the second level signal when the first level signal and the second level signal are turned off.

2. The power-off protection device as claimed in claim 1, wherein the reference voltage maintenance device comprises:

a flow-limiting resistor coupled to the first level signal; and a constant voltage diode coupled to the flow-limiting resistor and the modulating circuit for outputting a third level signal.

3. The power-off protection device as claimed in claim 1, wherein the constant voltage diode is a Zener diode.

4. The power-off protection device as claimed in claim 1, wherein the first level signal is higher than the second level signal.

5. The power-off protection device as claimed in claim 1, wherein the modulating circuit is a pulse-width-modulating IC.

6. The power-off protection device as claimed in claim 1, wherein the first level signal is 12V.

7. The power-off protection device as claimed in claim 1, wherein the second level signal is 3.3V.

8. The power-off protection device as claimed in claim 1, wherein the processor is a CPU.

* * * * *